US007554684B1

(12) United States Patent
Senoo et al.

(10) Patent No.: US 7,554,684 B1
(45) Date of Patent: Jun. 30, 2009

(54) CONFIGURABLE PRINTER MENU STRUCTURE

(75) Inventors: Masumi Senoo, Tokyo (JP); Kazuo Aoyama, Tokyo (JP); Shahzad H. Bhatti, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 962 days.

(21) Appl. No.: 09/506,407

(22) Filed: Feb. 17, 2000

(51) Int. Cl.
*G06F 15/00* (2006.01)
*G06F 15/173* (2006.01)

(52) U.S. Cl. ...................................... 358/1.15; 709/221

(58) Field of Classification Search ................ 358/1.15, 358/1.13, 1.1, 1.14, 1.16; 400/61, 70, 615.2; 399/75, 81, 1; 709/321, 221-222; 345/156, 345/590, 593, 810, 825; 347/29, 33, 42; 715/738, 821
See application file for complete search history.

(56) References Cited

U.S. PATENT DOCUMENTS 5,500,715 A * 3/1996 Ta et al. ......................... 399/1
5,533,176 A * 7/1996 Best et al. .................. 358/1.18
5,967,675 A * 10/1999 Hastings et al. ............... 400/61
6,094,548 A * 7/2000 Gunning et al. ............... 399/75
6,148,346 A * 11/2000 Hanson ...................... 709/321
6,349,304 B1 * 2/2002 Boldt et al. ................. 707/102
6,618,162 B1 * 9/2003 Wiklof et al. ............. 358/1.15

OTHER PUBLICATIONS

HP PDNO #10990093-1, U.S. Appl. No. 09/313,891, Inventor: James P. Slupe, et al Title: System And Method For Defining A User Interface.

* cited by examiner

*Primary Examiner*—Saeid Ebrahimi Dehkordy

(57) ABSTRACT

A printer is configured by creating a printer menu structure and installing the printer menu structure on the printer. The printer menu structure is installed on an erasable storage device in the printer. The installation of the printer menu structure replaces or extends any menu structure previously installed on the printer. Prior to installing the printer menu structure on the printer, the system simulates operation of the printer menu structure. The printer menu structure has a hierarchy of menu elements, each of which has an associated menu element type and an associated action. An icon may be associated with one or more of the menu elements.

20 Claims, 8 Drawing Sheets

270

| Menu Element (272) | Menu Element Type (274) | Action (276) | Argument (278) |
|---|---|---|---|
| Vacations | Icon Menu | Go Menu | 0101 |
| Cruises | Icon Menu | Go Menu | 0111 |
| Africa | Icon Menu | Go Menu | 0112 |
| Asia | Icon Menu | Go Menu | 0113 |
| Australia | Icon Menu | Go Menu | 0114 |
| Europe | Icon Menu | Go Menu | 0115 |
| United States | Icon Menu | Go Menu | 0116 |
| NorthEast | Icon Menu | Go Menu | 0130 |
| SouthEast | Icon Menu | Go Menu | 0131 |
| South | Icon Menu | Go Menu | 0132 |
| West | Icon Menu | Go Menu | 0133 |
| North Central | Icon Menu | Go Menu | 0134 |
| Hawaii | Icon Menu | Go Menu | 0135 |
| Alaska | Icon Menu | Go Menu | 0136 |
| Virgin Islands | Icon Menu | Go Menu | 0137 |
| Specials | Icon Menu | Go Menu | 0102 |
| Bermuda Cruise Special | Text Item | Web Print | http://www.url1 |
| Grand Canyon Vacation | Text Item | Web Print | http://www.url2 |
| Paris Vacation Special | Text Item | Web Print | http://www.url3 |
| Print Itinerary | Icon Menu | Go Menu | 0103 |
| Travel Tips | Icon Menu | Go Menu | 0104 |
| Traveling with Children | Text Item | Web Print | http://www.url4 |
| Foreign Travel Tips | Text Item | Web Print | http://www.url5 |

Fig. 7

CONFIGURABLE PRINTER MENU STRUCTURE

TECHNICAL FIELD

The invention relates to menu structures in printers that are configurable. More particularly, the invention relates to a system for creating and installing a printer menu structure in a printer.

BACKGROUND

Printers often include a display panel through which a user of the printer can receive information about the status of the printer. Additionally, one or more buttons, switches, or other input device may be provided on a printer to allow the user to control or manage the operation of the printer. A particular menu structure is typically contained in the printer. The menu structure provides the functions necessary to control or manage the operation of the printer. The user navigates the menu structure by pressing one or more buttons to select the desired menu operation (such as resetting the printer, initiating a form feed operation, or selecting a particular font or template).

In existing printers, the menu structure contained in the printer is fixed (i.e., the menu structure cannot be modified by the user of the printer). In many printers, the menu structure is permanently stored in a read-only memory device. In these printers, the menu structure cannot be modified unless a new read-only memory device is created and installed in the printer. When using a fixed menu structure, the printer user is limited to the functions provided by the printer manufacturer and limited to the selection of corresponding icons, if any, for each function. Furthermore, with a fixed menu structure, the printer user is limited to the language and the functionality chosen by the printer manufacturer. Once a printer has been manufactured it is difficult and expensive to modify the built-in menu structure.

For example, a user whose native language is not supported by a localized version of the printer from the manufacturer cannot easily modify a printer to display menu functions in the user's native language. It is not generally cost-effective for a printer manufacturer to create a localized version of the printer for every country. Typically, manufacturers will not create a localized version of a printer for small countries or countries with a small quantity of printer purchases. Printer users in these countries must select a version of the printer in a non-native language.

The invention described herein addresses these and other problems by providing a system for configuring a printer menu structure after the printer has been manufactured and distributed to an end-user.

SUMMARY

The present invention allows an end-user of a printer to configure a printer menu structure to meet their printing requirements. The printer user is able to determine the structure of the printer menu, select the font (and the language) used to display the menu structure, and design and/or identify icons associated with various menu elements. In a particular embodiment of the invention, a printer is configured by creating a printer menu structure and installing the printer menu structure on the printer. The printer menu structure is installed on an erasable storage device in the printer.

According to one aspect of the invention, the installation of the printer menu structure replaces any menu structure previously installed on the printer.

In one implementation of the invention, the installation of the printer menu structure extends any menu structure previously installed on the printer.

According to another aspect of the invention, operation of the printer menu structure is simulated prior to installing the printer menu structure on the printer.

According to another aspect of the invention, the printer menu structure includes a hierarchy of menu element and each menu element has an associated menu element type and an associated action.

A further aspect of the invention associates an icon with at least one menu element in the printer menu structure.

BRIEF DESCRIPTION OF THE DRAWINGS

The present invention is illustrated by way of example and not limitation in the figures of the accompanying drawings. The same numbers are used throughout the figures to reference like components and/or features.

FIG. 7 is a table containing a portion of a menu hierarchy and associated menu element parameters.

DETAILED DESCRIPTION

The present invention allows the user of a printer to create a customized printer menu structure to meet their printing requirements. The printer user determines the structure of the printer menu, selects the font (and the language) used to display the menu structure, and selects icons associated with various menu elements. The printer menu structure can be varied based on the anticipated users of the printer. For example, if novice users or children are expected to use the printer, a simplified menu structure containing descriptive icons may be appropriate. If more experienced users will be using the printer, then a more detailed menu structure with fewer icons might be suitable.

Figure 1:
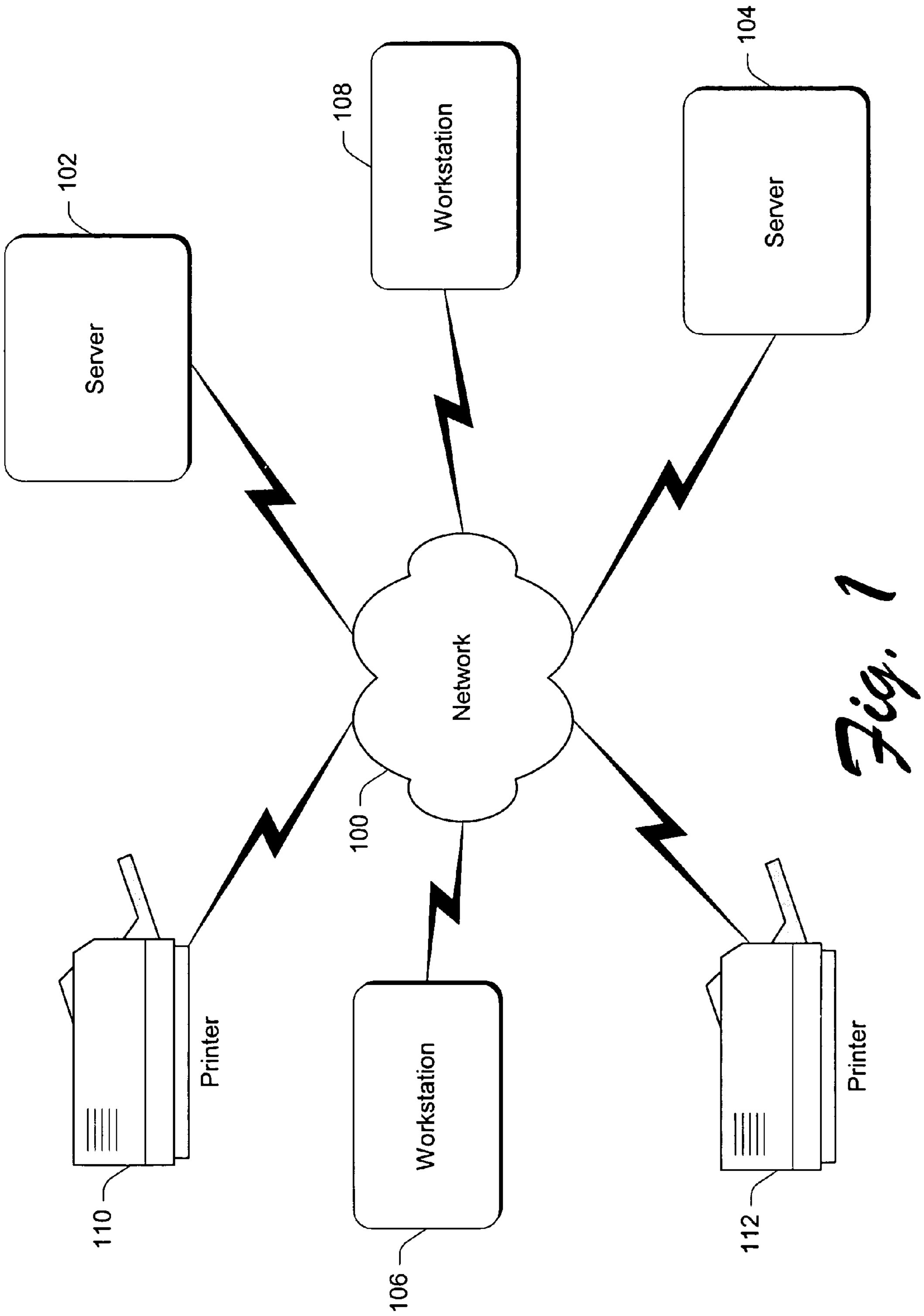
FIG. 1 illustrates a network environment in which multiple servers, workstations, and printers are coupled to one another via a data communication network.

FIG. 1 illustrates a network environment in which multiple servers, workstations, and printers are coupled to one another via a data communication network 100. The network 100 couples together servers 102 and 104, computer workstations 106 and 108, and printers 110 and 112. Network 100 can be any type of network, such as a local area network (LAN) or a wide area network (WAN), using any type of network topology and any network communication protocol. Although only a few devices are shown coupled to network 100, a typical network may have tens or hundreds of devices coupled to one another. Furthermore, network 100 may be coupled to one or more other networks, thereby providing coupling between a greater number of devices.

Servers 102 and 104 may be file servers, email servers, database servers, or any other type of network server. Workstations 106 and 108 can be any type of computing device, such as a personal computer. Particular embodiments of the invention illustrate printers 110 and 112 as laser printers. However, alternate embodiments of the invention are implemented with ink-jet or any other type of printer. As discussed in greater detail below, a printer menu editor application is executed on workstation 106 or 108, or on server 102 or 104, to create or modify a printer menu structure. After the printer menu structure has been completed, the menu is "installed" by communicating the menu data across network 100 to one or more printers, such as printer 110 or 112.

Figure 2:
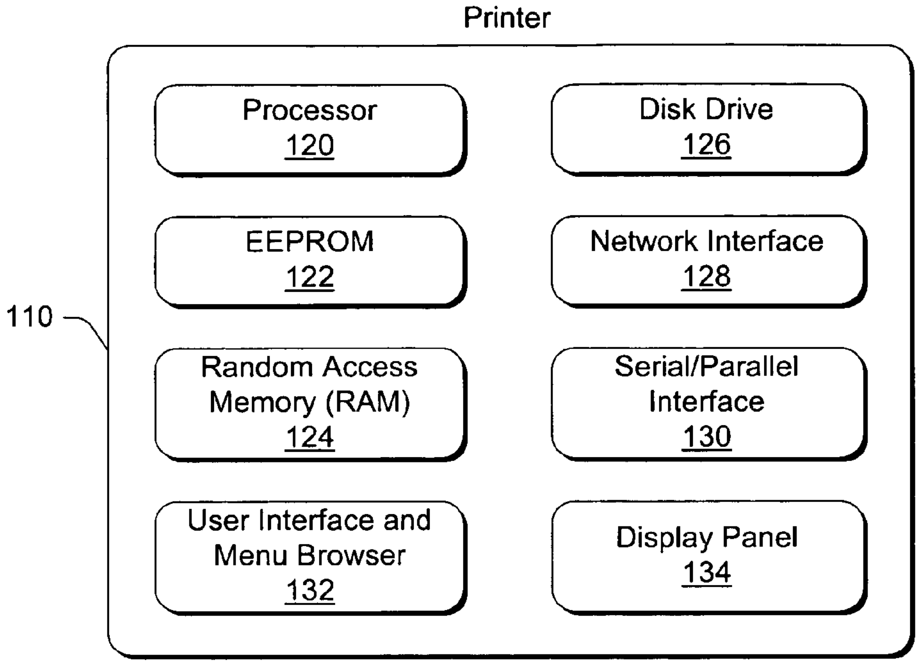
FIG. 2 is a block diagram showing pertinent components of a printer in accordance with the invention.

FIG. 2 is a block diagram showing pertinent components of printer 110 in accordance with the invention. Printer 110 includes a processor 120, an electrically erasable programmable read-only memory (EEPROM) 122, and a random access memory (RAM) 124. Processor 120 processes various instructions necessary to operate the printer 110 and communicate with other devices. EEPROM 122 and RAM 124 store various information such as configuration information, fonts, templates, data being printed, and menu structure information. Although not shown in FIG. 2, a particular printer may also contain a ROM (non-erasable) in place of or in addition to EEPROM 122. Furthermore, a printer may alternatively contain a flash memory device in place of or in addition to EEPROM 122.

Printer 110 also includes a disk drive 126, a network interface 128, and a serial/parallel interface 130. Disk drive 126 provides additional storage for data being printed or other information used by the printer 110. Although both RAM 124 and disk drive 126 are illustrated in FIG. 2, a particular printer may contain either RAM 124 or disk drive 118, depending on the storage needs of the printer. For example, an inexpensive printer may contain a small amount of RAM 124 and no disk drive 118, thereby reducing the manufacturing cost of the printer. Network interface 128 provides a connection between printer 110 and a data communication network, such as network 100. Network interface 128 allows devices coupled to a common data communication network to send print jobs, menu data, and other information to printer 110 via the network. Similarly, serial/parallel interface 130 provides a data communication path directly between printer 110 and another device, such as a workstation, server, or other computing device. Although the printer 110 shown in FIG. 2 has two interfaces (network interface 128 and serial/parallel interface 130), a particular printer may only contain one interface.

Printer 110 also contains a user interface/menu browser 132 and a display panel 134. User interface/menu browser 132 allows the user of the printer to navigate the printer's menu structure. User interface 132 may be a series of buttons, switches or other indicators that are manipulated by the user of the printer. Display panel 134 is a graphical display that provides information regarding the status of the printer and the current options available through the menu structure. In a particular embodiment of the invention, the display panel 134 is a liquid crystal display having a two-dimensional array of pixels capable of generating various fonts, icons, and other images. The size of the icons, text, or other images can be adjusted based on the size of the display panel. In one implementation of the invention, user interface 132 is a touch-sensitive screen that overlays display panel 134. Thus, the user can provide input to the printer 110 by touching the appropriate portion of the touch screen. The touch screen is substantially transparent such that the images displayed on panel 134 are visible to the user through the touch screen. The touch screen may be used in combination with one or more physical buttons or switches on the printer. If the icons, text, or other images are too large to be displayed on the display panel simultaneously, scroll arrows or scroll bars may be displayed on the display panel to indicate that additional information is available for viewing. The scrolling feature can be activated by touching the appropriate arrow on the display panel (in a system containing a touch screen) or by touching the appropriate button or switch.

Figure 3:
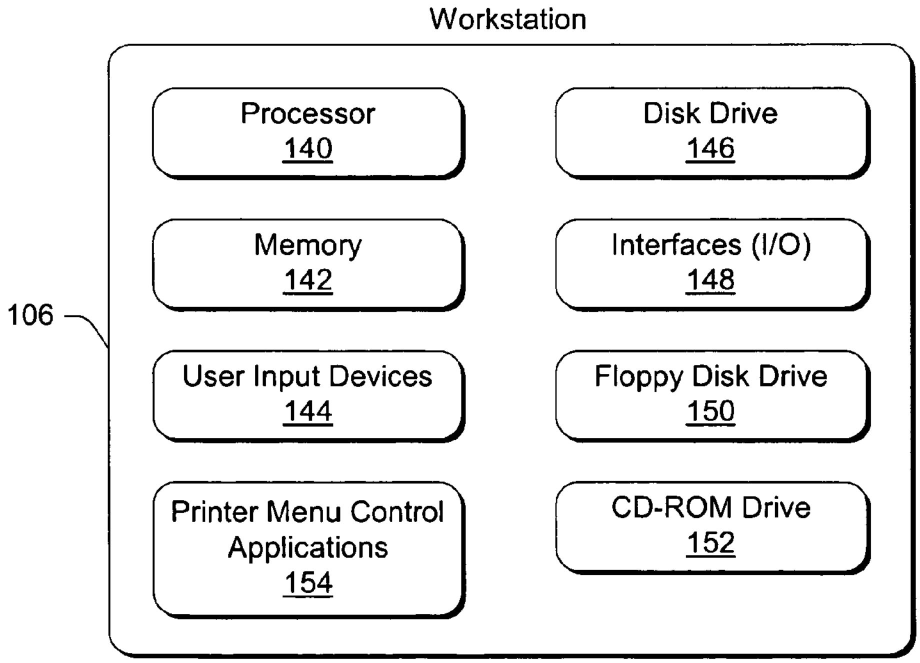
FIG. 3 is a block diagram showing pertinent components of a computer workstation in accordance with the invention.

FIG. 3 is a block diagram showing pertinent components of a computer workstation 106 in accordance with the invention. Workstation 106 includes a processor 140, a memory 142 (such as ROM and RAM), user input devices 144, a disk drive 146, interfaces 148 for inputting and outputting data, a floppy disk drive 150, and a CD-ROM drive 152. Processor 140 performs various instructions to control the operation of workstation 106. Memory 142, disk drive 146, and floppy disk drive 150, and CD-ROM drive 152 provide data storage mechanisms. User input devices 144 include a keyboard, mouse, pointing device, or other mechanism for inputting information to workstation 106. Interfaces 148 provide a mechanism for workstation 106 to communicate with other devices. Workstation 106 also includes printer menu control applications 154, which allow a user of the workstation to create, edit, and install printer menu structures. The printer menu control applications 154 are discussed in greater detail below.

Figure 4:
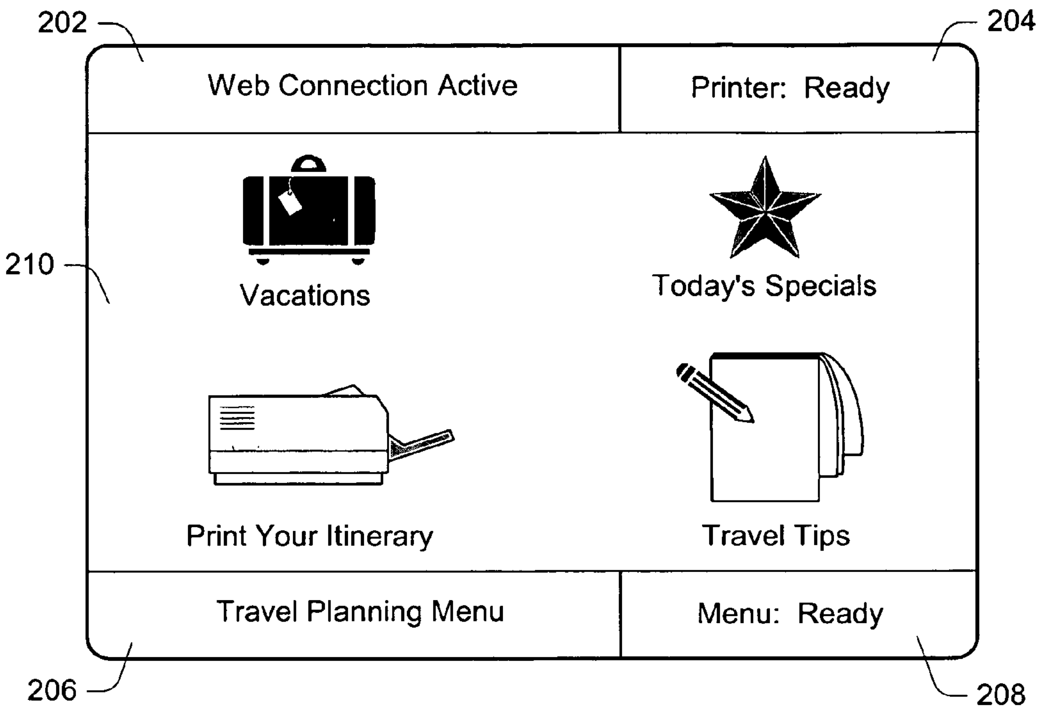
FIG. 4 illustrates an exemplary display of information on a printer display panel.

FIG. 4 illustrates an exemplary display of information on a printer display panel (such as display panel 134 in FIG. 2). The display panel is divided into five different sections 202, 204, 206, 208, and 210. These are logical divisions, not physical divisions. The display panel is a single contiguous display. Section 202 displays information about the printer, such as whether a network connection is active or whether the toner cartridge is low on toner. Section 204 displays the status of the printer. Section 206 displays information about the menu, such as the currently active menu. Section 208 indicates the status of the menu. The center section 210 provides varying menu selections that allow a user of the printer to navigate the printer's menu structure. Although a particular display layout is illustrated in FIG. 4, it will be appreciated that the present invention can be used with any display layout, including any number of sections.

As shown in FIG. 4, section 206 indicates that the menu system is currently in the travel planning menu and section 210 contains the four main areas within the travel planning menu (Vacations, Specials, Print Itinerary, and Travel Tips). Each of the four areas shown in section 210 has a corresponding icon. The use of icons is optional. In alternate embodiments, the text associated with each selection is displayed without a corresponding icon.

As discussed below, the travel planning menu contains a hierarchy of menu elements. The four menu elements shown in section 210 represent the highest level in the menu hierarchy. If one of the four elements is selected, section 210 of the display changes to illustrate the menu elements in the next level of the hierarchy. For example, if the user selects "Vacations", section 210 changes to display seven categories of vacations (e.g., Cruises, Africa, Asia, Australia, Europe, United States, and Other). If a touch screen overlays the printer display panel, the user selects a menu element by touching the touch screen above the desired menu element. Alternatively, navigational buttons (or another input device) are used to highlight the desired menu element. Once the desired menu element is highlighted, a selection button is activated to select the highlighted menu element. After selecting a particular menu element, section 210 changes to display the next menu level or the printer performs the selected function, whichever is appropriate.

Figure 5:
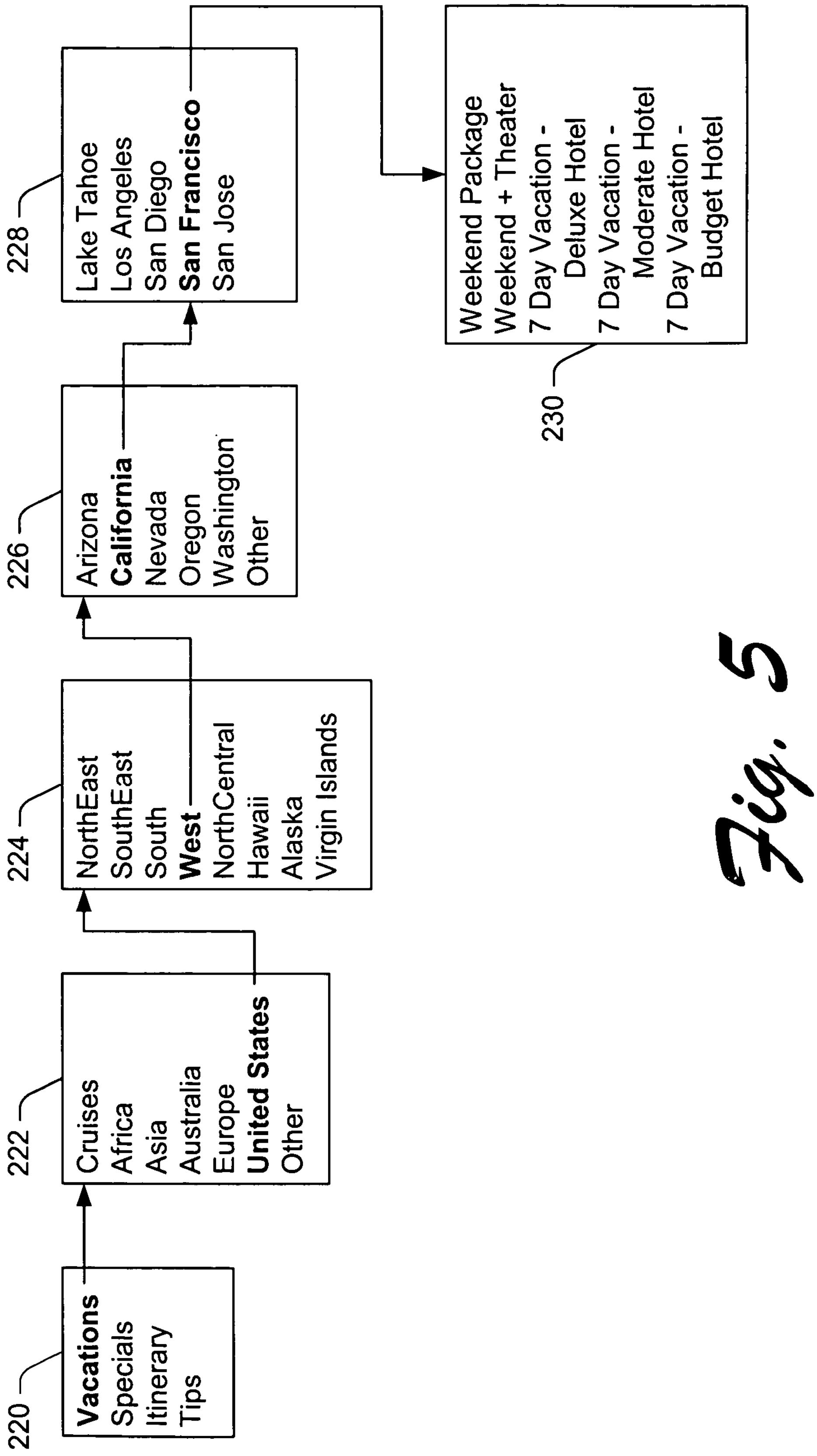
FIG. 5 illustrates a portion of a menu hierarchy contained in a printer menu structure.

FIG. 5 illustrates a portion of a menu hierarchy contained in a printer menu structure. Group 220 contains the four menu elements that were shown in FIG. 4, and represent the highest level of the menu hierarchy (also referred to as the "default level"). If the user selects "Vacations" from group 220, the menu branches to group 222, which contains the seven categories of vacations. If the user then selects "United States" from group 222, the menu branches to group 224, which contains the categories of vacations in the United States. The selection process continues to group 226 (U.S. Western Vacations) and to group 228 (California Vacations). After a city is selected from group 228, the final level 230 of the menu hierarchy is reached. At this lowest level of the hierarchy, selecting one of the vacation packages results in the printer creating a printed copy of the vacation package. After printing the selected vacation package information, the user can print information regarding another package or can back up through the menu hierarchy to select another vacation destination. If the user does not enter a selection within a particular period of time (for example, five minutes), the printer will reset its display panel to display the default level of the menu hierarchy. Although not shown in FIG. 5, each group 222-230 includes a "back" selection, which causes the display to move back one level (i.e., one level higher in the menu hierarchy). This "back" selection allows the user to return to the previous display if the selected the wrong menu element.

The example of FIG. 4 and FIG. 5 allows a user to print information regarding vacations and vacation packages. In this example, the printer may be owned and administered by a travel agency. As used herein, an "administrator" is an individual who develops, maintains, and edits printer menu structures. Since an administrator can modify the menu structure, the daily specials and vacation packages can be updated as needed. Furthermore, if different printers are located in different countries, the menu structure of each printer can be modified to display the native language of the country in which the printer is located.

Figure 6:
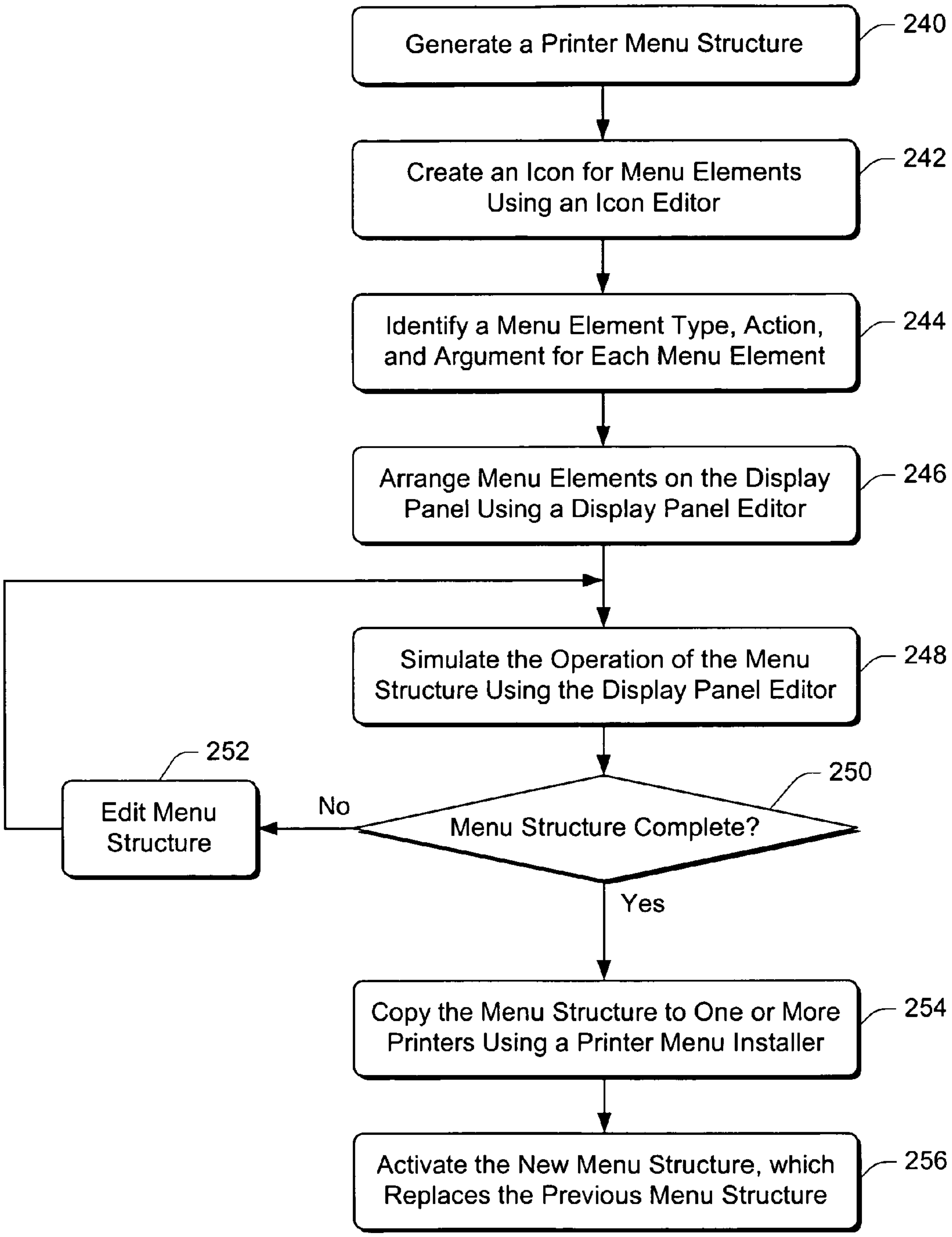
FIG. 6 is a flow diagram illustrating a procedure for creating and installing a printer menu structure in one or more printers.

FIG. 6 is a flow diagram illustrating a procedure for creating and installing a printer menu structure in one or more printers. Initially, a printer menu structure is generated (step 240). The menu structure is generated using one or more applications, such as a menu structure editor, an icon editor, and a display panel editor. These applications create a menu hierarchy and associate various information with each menu element. The menu structure editor may include a blank template used to begin generating a new printer menu structure. The icon editor is used to create or modify icons that will be associated with menu elements in the menu hierarchy. An exemplary icon editor generates a two-dimensional array of pixels (or dots) to represent an icon. The display panel editor simulates a printer's display panel on a workstation, thereby allowing the administrator to develop and test the menu structure without actually installing the menu structure on a printer.

As discussed above, an administrator may optionally develop one or more icons that are associated with menu elements using an icon editor (step 242). For each menu element in the menu structure, the administrator determines a menu element type, a menu action, and an argument associated with the menu element (step 244). The menu element type identifies whether the menu element points to another group of menu elements (e.g., "Vacations" in group 220 (FIG. 5) points to another group of menu elements 222) or points to an actual document (e.g., the menu elements in group 230 each point to an actual document that is printed). Alternatively, the menu element may execute a particular function or operation (e.g., changing the mode of the printer from portrait to landscape or activating a "staple documents" feature of the printer). The menu action identifies the action or function to be performed if the menu element is selected. The action may cause a "jump" to another part of the menu structure to display another group of menu elements or the action may cause the printing of a particular document. The argument associated with the menu element identifies the argument used by the menu action or specifies a particular function or operation to be executed. For example, the argument may identify the "jump" point in the menu structure, the location and name of the document to be printed, or the name of the function to be executed.

The menu elements are arranged on the display panel using a display panel editor (step 246). The display panel editor provides a simulated printer display panel for arranging the menu elements. The operation of the menu structure is then simulated using the display panel editor (step 248). The display panel editor allows the administrator to select particular menu elements and verify that the proper action takes place. If the menu structure is not complete or not operating as desired, the menu structure is further edited (step 252) and the procedure returns to continue simulating the operation of the menu structure (step 248). If the menu structure is complete, then the menu structure is copied to one or more printers using a printer menu installer (step 254). The printer menu installer loads the new menu structure into the appropriate memory location in each printer and activates the new menu structure (step 256), which replaces the previous menu structure, if any. Steps 254 and 256, taken together, may be referred to as "installing" the new menu structure. Alternatively, after the new menu structure is complete, the actual installation of the new menu structure may be delayed until a future time. For example, if the new menu structure contains tomorrow's travel specials, the new menu will not be loaded until after midnight. Similarly, if the printer is busy during regular business hours, the installation of the new menu structure may be delayed until a time when the printer is not likely to be in use.

In another embodiment of the invention, the "installation" of the new menu structure does not delete the previous menu structure. Instead, the new menu structure is added to the previous menu structure, thereby extending the printer's menu structure.

As discussed above, installing a new menu structure replaces or extends a previous menu structure. After the installation procedure, the new (or extended) menu structure may remain active in the printer. Alternatively, the new (or extended) menu structure may be deleted from the printer such that the printer reverts back to the previous menu structure or to a default menu structure.

FIG. 7 is a table 270 containing a portion of a menu hierarchy and associated menu element parameters. The menu hierarchy shown in FIG. 7 corresponds to the hierarchy shown in FIG. 5. A first column 272 of table 270 identifies particular menu elements. Note that column 272 contains only a portion of the total menu elements contained in the menu hierarchy. A second column 274 identifies a menu element type associated with each menu element. In this example, two different types of menu elements are shown ("Icon Menu" and "Text Item"). The type "Icon Menu" indicates that the menu element points to another group of menu elements. The type "Text Item" indicates that the menu element points to a document or other text item that is printed in response to selecting the menu element. Thus, selecting "Asia" opens a new group of menu items, but selecting "Traveling with Children" causes an associated document to print.

In another example, a menu element type "function" may be provided (not shown). The type "function" indicates that a printer operation or function is to be performed. For example, a menu element "Change to Landscape" indicates that selection of the menu element will change the printer to a landscape printing mode.

A third column 276 identifies an action to be taken if the menu element is selected. In this example, two actions are "Go Menu" which causes a "jump" to another location in the menu structure and "Web Print" which causes a web document to be printed on the printer. The fourth column 278 provides an argument to the corresponding action identified in column 276. If the action is "Go Menu", then the argument identifies the "jump" point it the menu structure. For example, if the user selects "Cruises", the action is "Go Menu" and the argument is "0111", which indicates a location within the menu structure. Thus, selecting "Cruises" causes the printer display panel to display the menu elements starting at location 0111, which are the menu elements associated with the different types of cruise vacations. If the user selects "Grand Canyon Vacation", the action is "Web Print" and the argument identifies the web location of the document. In this situation, the printer retrieves the identified document from its web location and prints the document. In the example of FIG. 7, the location of the web document is identified by a uniform resource locator (URL). However, in alternate embodiments, any type of pointer or identifier may be used to locate a document stored on a web server or other storage mechanism.

Figure 8:
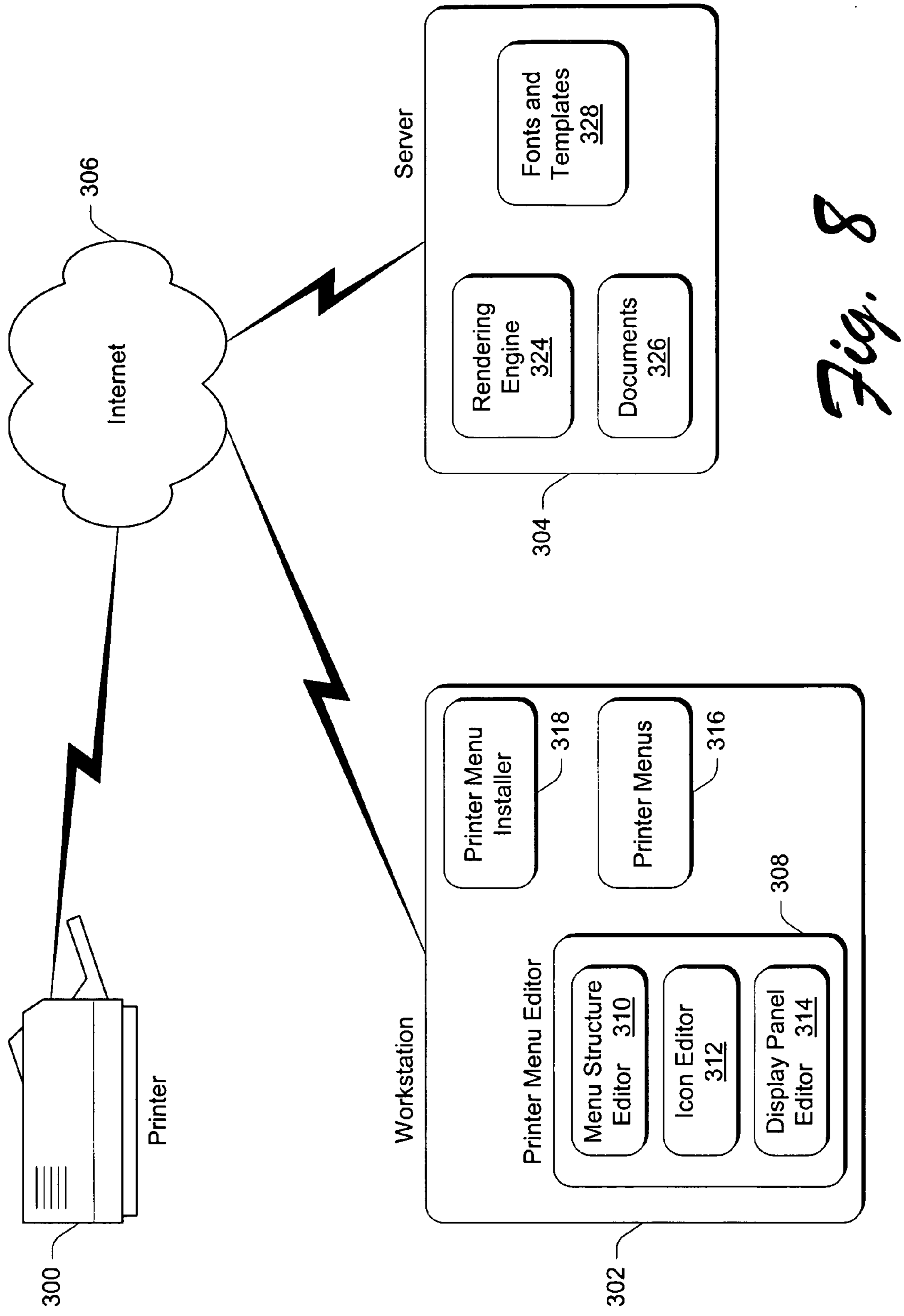
FIG. 8 illustrates a workstation, a server, and a printer coupled together via the Internet.

FIG. 8 illustrates a workstation 302, a server 304, and a printer 300 coupled together via the Internet 306. The workstation 302 includes printer menu editor applications 308, which include a menu structure editor 310, an icon editor 312, and a display panel 314. Additionally, workstation 302 includes a printer menu installer application 318 and one or more printer menus 316. Workstation 302 may store multiple printer menus to support multiple different printers coupled to the Internet. Also, workstation 302 may store multiple printer menus for use with printer 300. For example, a different menu structure may be used for each day of the week. When installing a printer menu structure using installer 318, the same menu structure can be downloaded to multiple printers simultaneously. This ensures that each printer will receive the new menu structure at the same time.

In the example above, the printers are owned and administered by a travel agency. The travel agency can provide multiple unattended printers at shopping malls, airports, colleges, etc. The administrator updates the printer menu structure at one location and installs the updated menu structure to all of the remote printers simultaneously. Thus, all printers have access to the same specials and other information at the same time.

Server 304 includes a rendering engine 324, one or more documents 326, and one or more fonts, templates, or other data used to print a particular document. Rendering engine 324 renders a document into a directly printable form by incorporating any fonts, templates, or other data required to render the document. Once the document is rendered, it may be communicated to one or more printers, or may be stored on the server for later distribution to one or more printers. Storing the rendered document saves time if the document is repeatedly requested from a printer. Instead of rendering the document each time it is requested by a printer, the server renders the document once and provides the rendered document to the printers upon request. Additionally, providing a rendered document to a printer eliminates the requirement that the printer be able to render the document. Thus, a less expensive printer can be used because no rendering engine is required.

In an alternative embodiment, server 304 does not perform any document rendering. Instead, the requested document is provided to the printer (which has a rendering engine) and the printer performs the rendering operation.

In a particular embodiment of the invention, the JAVA® programming environment is used to develop and implement the various printer menu editing operations and printer menu installation and management procedures. Also, a particular embodiment of the invention uses the extensible markup language (XML) to exchange information between a printer and a workstation, server, or other device.

Figure 9:
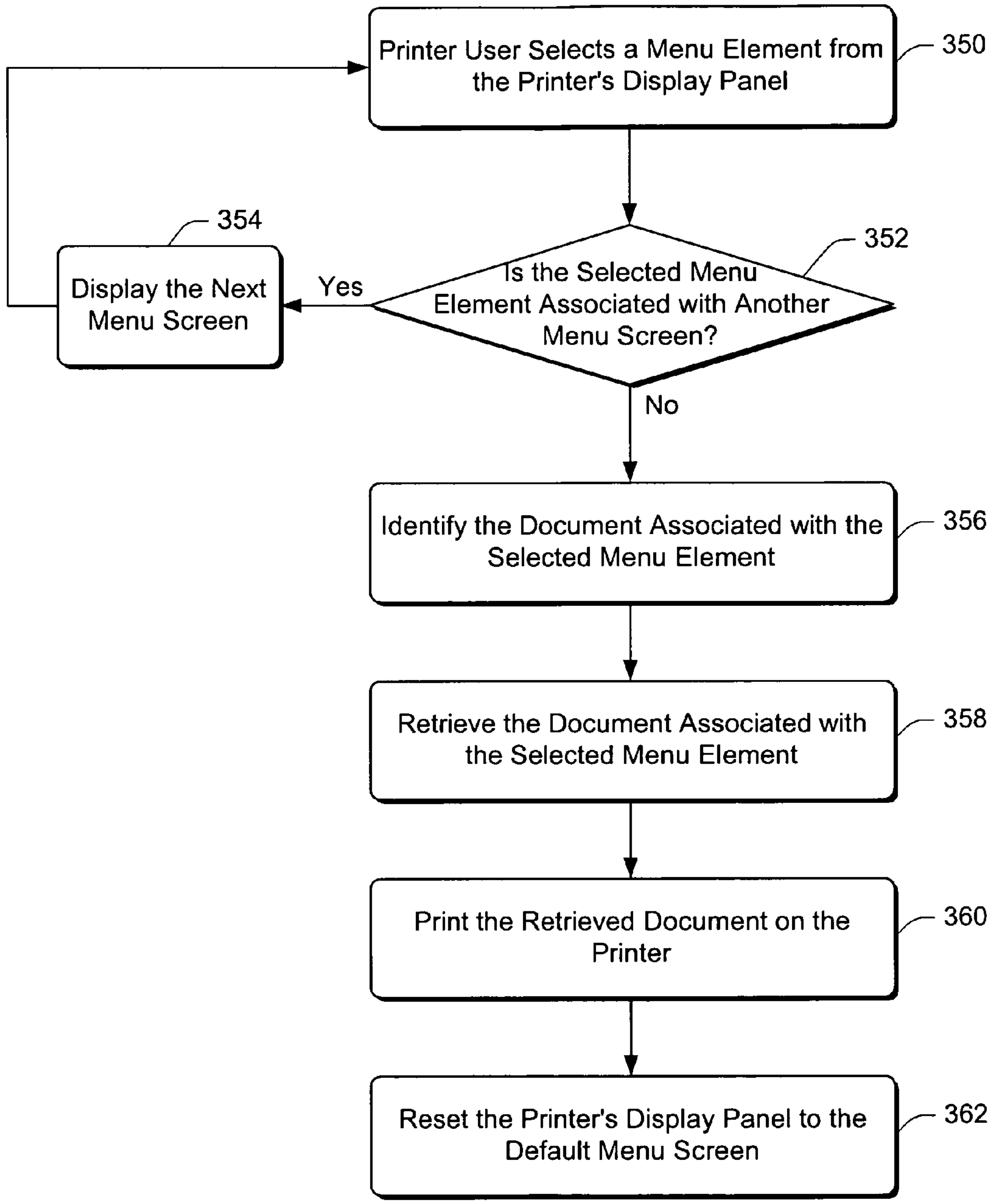
FIG. 9 is a flow diagram illustrating a procedure for selecting and processing menu elements in a printer menu structure.

FIG. 9 is a flow diagram illustrating a procedure for selecting and processing menu elements in a printer menu structure. Initially, the printer user selects a menu element from the printer's display panel (step 350). If the selected menu element is associated with another menu screen (e.g., menu element type "Icon Menu" in FIG. 7), then the next menu screen is displayed (step 354). The procedure then returns to let the printer user select a menu element from the new menu screen on the printer's display panel (step 350). If the selected menu element is not associated with another menu screen (e.g., the menu element is associated with a printable document), then the procedure identifies the document (or printer function) associated with the selected menu element (step 356). The procedure retrieves the document associated with the selected menu element using, for example, the associated argument discussed FIG. 7 (step 358). The retrieved document is printed on the printer (step 360). After printing the retrieved document, the printer's display panel is reset to the default menu screen (step 362). Alternatively, the printer's display panel may continue to display the same menu elements, thereby allowing the user to print another document or navigate elsewhere in the menu structure. If the user does not make any selection on the printer within a particular period of time (such as five minutes), the printer's display panel is automatically reset to the default menu screen.

Although a particular example application of the invention has been described in the context of a travel agency, it will be appreciated that the teachings of the present invention can be applied to any type of information in any type of industry or organization. For example, product brochures and product literature can be provided using the systems discussed herein. Additionally, bank account information, current interest rates, loan applications, and other financial information can be provided via a printer using the techniques described herein.

Thus, a system for creating and installing a printer menu structure in a printer has been described herein. This configurable printer menu structure allows end-users to configure their printers to meet their needs. The printer menu structure can be configured using the native language for the area in which the printer is located. The configurable printer menu structure also allows unattended printers to distribute various types of printed information to individuals that use the printer menu structure to select their desired information.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method of configuring a printer, the method comprising:

creating a printer menu structure; and installing the printer menu structure on the printer, wherein the printer menu structure is installed on an erasable storage device in the printer.

2. A method as recited in claim 1 wherein installing the printer menu structure replaces any menu structure previously installed on the printer.

3. A method as recited in claim 1 wherein installing the printer menu structure extends any menu structure previously installed on the printer.

4. A method as recited in claim 1 further comprising simulating operation of the printer menu structure prior to installing the printer menu structure on the printer.

5. A method as recited in claim 1 wherein creating a printer menu structure includes creating a hierarchy of menu elements.

6. A method as recited in claim 5 wherein each menu element has an associated menu element type and an associated action.

7. A method as recited in claim 1 wherein creating a printer menu structure includes associating an icon with at least one menu element in the printer menu structure.

8. A method as recited in claim 1 wherein the method is performed by an end-user of the printer.

9. A method as recited in claim 1 wherein creating a printer menu structure includes determining the arrangement of a plurality of menu elements on a printer display panel.

10. A computer-readable memory containing a computer program that is executable by a processor to perform the method recited in claim 1.

11. A printer comprising:

a display panel to display a plurality of menu elements;

a user interface coupled to the display panel to allow a user to select among the plurality of menu elements; and a data communication interface coupled to the display panel to allow the printer to receive a printer menu structure from a remote device.

12. An apparatus as recited in claim 11 wherein the data communication interface is a network interface.

13. An apparatus as recited in claim 11 wherein the printer is a laser printer.

14. An apparatus as recited in claim 11 wherein the user interface is a touch-sensitive screen positioned proximate the display panel.

15. An apparatus as recited in claim 11 further comprising a memory device coupled to the data communication interface to store a printer menu structure received from the remote device.

16. One or more computer-readable media having stored thereon a computer program comprising the following steps:

creating a printer menu structure; and installing the printer menu structure on a printer, wherein the printer menu structure is installed on an erasable storage device in the printer.

17. One or more computer-readable media as recited in claim 16 wherein installing the printer menu structure replaces any menu structure previously installed on the printer.

18. One or more computer-readable media as recited in claim 16 further comprising simulating operation of the printer menu structure prior to installing the printer menu structure on the printer.

19. One or more computer-readable media as recited in claim 16 wherein creating a printer menu structure includes creating a hierarchy of menu elements.

20. One or more computer-readable media as recited in claim 16 wherein creating a printer menu structure includes creating a hierarchy of menu elements, and each menu element has an associated menu element type and an associated action.

* * * * *